United States Patent
Chung

(10) Patent No.: US 10,023,808 B2
(45) Date of Patent: Jul. 17, 2018

(54) SYSTEM FOR EVAPORATING VOLATILE MATERIAL TO RECYCLE OIL SHALE EXTRACTION RESIDUE, AND METHOD FOR RECYCLING OIL SHALE EXTRACTION RESIDUE BY USING SAME

(71) Applicant: CRI CO., LTD., Daejeon (KR)

(72) Inventor: Soo Hyun Chung, Daejeon (KR)

(73) Assignee: CRI CO., LTD., Daejeon (KR)

( * ) Notice: Subject to any disclaimer, the term of this patent is extended or adjusted under 35 U.S.C. 154(b) by 174 days.

(21) Appl. No.: 14/897,279

(22) PCT Filed: Dec. 4, 2013

(86) PCT No.: PCT/KR2013/011160
§ 371 (c)(1),
(2) Date: Dec. 10, 2015

(87) PCT Pub. No.: WO2014/200166
PCT Pub. Date: Dec. 18, 2014

(65) Prior Publication Data
US 2016/0130507 A1    May 12, 2016

(30) Foreign Application Priority Data
Jun. 12, 2013   (KR) .................. 10-2013-0066931

(51) Int. Cl.
C10G 1/04       (2006.01)
B01D 1/00       (2006.01)
(Continued)

(52) U.S. Cl.
CPC ........... *C10G 1/045* (2013.01); *B01D 1/0047* (2013.01); *B01D 1/0052* (2013.01);
(Continued)

(58) Field of Classification Search
CPC . C10G 1/04; C10G 1/045; C10G 7/00; B01D 1/0047; B01D 1/0052;
(Continued)

(56) References Cited

U.S. PATENT DOCUMENTS 4,357,230 A * 11/1982 Sibley ...................... C10G 1/04
                                                              208/390
4,365,976 A * 12/1982 Frohnert ................... B03C 3/00
                                                              208/161

(Continued)

FOREIGN PATENT DOCUMENTS

WO          91-13948 A1      9/1991

OTHER PUBLICATIONS

Paul, Edward L. et al, Handbook of Industrial Mixing: Science and Practice, Ch. 6, pp. 352-353 (Year: 2004).*

(Continued)

*Primary Examiner* — Renee Robinson
(74) *Attorney, Agent, or Firm* — STIP Law Group, LLC

(57) ABSTRACT

The present invention relates to a recycling system and a method for recycling by means of same, in which sludge, an extraction residue of oil shale, is drawn into a light oil mixing tank and mixed thoroughly by means of light oil or an extractant to separate heavy oil, then heavy oil and the extractant/light oil are additionally recovered by means of a sludge separation apparatus, and the oil shale sludge, which is an extraction residue, is transported, after preliminary storage in an intermediate storage tank, to an evaporation apparatus for recovering light oil so as to maximally recover the extractant/light oil and the like which is the final organic material possible to be recovered, thereby allowing dry oil shale residue to be generated.

20 Claims, 3 Drawing Sheets

(51) Int. Cl.
*B01D 11/02* (2006.01)
*B01D 17/04* (2006.01)
*C10G 1/00* (2006.01)
*C10G 7/00* (2006.01)

(52) U.S. Cl.
CPC .......... *B01D 1/0064* (2013.01); *B01D 11/028* (2013.01); *B01D 11/0226* (2013.01); *B01D 11/0257* (2013.01); *B01D 11/0292* (2013.01); *B01D 17/047* (2013.01); *C10G 1/002* (2013.01); *C10G 1/04* (2013.01); *C10G 7/00* (2013.01)

(58) Field of Classification Search
CPC .............. B01D 1/0064; B01D 11/0226; B01D 11/0257; B01D 11/0292
See application file for complete search history.

(56) References Cited

U.S. PATENT DOCUMENTS

| | | | |
|---|---|---|---|
| 5,897,690 A * | 4/1999 | McGrew .............. | B01D 5/0027 95/188 |
| 8,261,823 B1 | 9/2012 | Hill et al. | |
| 2006/0180503 A1 | 8/2006 | Rendall | |
| 2013/0045902 A1 | 2/2013 | Thompson et al. | |

OTHER PUBLICATIONS

International Search Report for PCT/KR2013/011160 dated Mar. 20, 2014.

* cited by examiner

SYSTEM FOR EVAPORATING VOLATILE MATERIAL TO RECYCLE OIL SHALE EXTRACTION RESIDUE, AND METHOD FOR RECYCLING OIL SHALE EXTRACTION RESIDUE BY USING SAME

CROSS-REFERENCE TO RELATED APPLICATIONS

This application is the U.S. National Phase under 35 U.S.C. § 371 of International Application No. PCT/KR2013/011160 filed on Dec. 4, 2013, which in turn claims the benefit of Korean Application No. 10-2013-0066931, filed on Jun. 12, 2013, the disclosures of which are incorporated by reference into the present application.

TECHNICAL FIELD

The present invention relates to a system for recovering an extractant/light oil and kerogen pyrolysis heavy oil, which remain in oil shale, from oil shale extraction residue generated after the extraction of the kerogen pyrolysis heavy oil from the oil shale by using the extractant or light oil, and a method for recycling oil shale extraction residue using the same, and is to minimize a remaining volatile material by using a volatile material evaporation system which includes an evaporation apparatus for recovering the light oil, for the purpose of environment-friendly treating or recycling of the oil shale extraction residue, from which the shale oil is separated.

The evaporation apparatus for recovering the light oil, used herein, employs a jacket heating method, in which a heating medium that has been heated is injected into an outer case or the inside of a rotation shaft so as to heat the same. Therefore, it is possible to efficiently increase the internal temperature of the evaporation apparatus. In addition, a suction pump is used so as to maintain the internal pressure of the evaporation apparatus at negative pressure lower than the atmospheric pressure, thereby increasing the evaporation efficiency of the oil shale residue. Further, a plurality of paddle discs connected to a plurality of shafts rotate in the evaporation apparatus in the opposite directions from each other so as to improve the mixing efficiency of the oil shale residue, thereby further increasing the evaporation efficiency of the oil shale extraction residue.

Furthermore, when the light oil or the extractant, discharged through a light oil vapor discharge hole connected to the evaporation apparatus for recovering the light oil, is recovered in a vapor shape, oil shale dust particles contained in the light oil vapor may be effectively eliminated by additionally providing a dust filtering device such as an electrostatic precipitator, thereby further improving the light oil recovering efficiency.

BACKGROUND ART

In general, kerogen contained in oil shale rocks are pyrolized and recovered in the shape of shale oil by a pyrolysis (retorting) method, wherein such a pyrolysis technique has been applied in common to all the retorting method by mining or the recovering method in a buried state in the field. However, according to such a pyrolysis method, kerogen existing in the shape of hydrocarbon polymer is pyrolized so as to be recovered, wherein the step of heating the oil shale is essentially included. Therefore, there is a disadvantage that 50% or more of kerogen is converted into gas in the heating step or remains as an organic matter having a high boiling point in the oil shale, decreasing the amount of the oil component.

Further, after the shale oil is recovered through the pyrolysis, it is possible to consider the recycling feasibility of the remaining oil shale residue as a soil remediation or construction material. However, there is a problem that, if the amount of the carbon or the organic matters remaining in the remaining oil shale is high, such recycling is impossible. Therefore, the oil shale residue obtained after the shale oil is recovered through such a normal pyrolysis method has been treated to be burned again such that energy is recovered and simultaneously the applicability thereof as a secondary by-product is increased.

However, when applying the additional combustion process to the oil shale residue as above, the possibility of noxious gas emission such as dioxin is increased due to the carbon or the organic matters and the like, which remain in the oil shale residue. In addition, when the oil shale residue is burned at a high temperature, calcium carbonate or magnesium carbonate and the like, which are the main components of the rocks, are thermally decomposed, emitting carbon dioxide that is the greenhouse gas. Therefore, improvement of the existing pyrolysis process is essentially demanded.

In order to solve these problems, the present applicant has been suggested a method for extracting kerogen pyrolysis heavy oil from oil shale by using an extractant or light oil in his prior application (Korean Patent Application No. 2013-0025437). If the oil shale is treated by this method, it is possible to maintain a remarkably higher recovering rate rather than the shale oil recovering rate of the existing pyrolysis process. In addition, it has been recognized that the energy consumption per unit kerogen extraction amount to be recovered and the emission amount of carbon dioxide could be innovatively reduced.

However, it is still technically difficult to completely extract kerogen in the oil shale by this method, which uses an extractant or light oil, and thus part of remaining kerogen pyrolysis heavy oil or a small amount of the extractant/light oil exists in the oil shale residue. Therefore, it has been demanded to provide an economical and effective elimination method for additionally recovering the remaining volatile material such as the remaining kerogen pyrolysis heavy oil or a small amount of the extractant/light oil, existing in the oil shale extraction residue discharged through the extraction method.

Therefore, the present invention is derived to solve the above problems and disadvantages and provides a recovering method for economically treating and recycling the oil shale extraction residue with high efficiency.

DETAILED DESCRIPTION OF THE INVENTION

Technical Problems

The present invention relates to an evaporation system of a volatile material and a method for recycling oil shale extraction residue by using the same, wherein, after recovering kerogen pyrolysis heavy oil from oil shale by using an extractant (light oil), the kerogen pyrolysis heavy oil and the light oil/extractant remaining in the oil shale extraction residue obtained in a sludge state can be effectively recovered through semi-continuous steps.

The invention of the prior patent application of the present applicant, mentioned as above in the background art, discloses an example, wherein kerogen pyrolysis heavy oil, an extractant or light oil and the like are recovered from oil shale, which has passed through a kerogen extraction reaction device, through a sludge separation apparatus and a distillation tower and, after that, are discharged as the oil shale extraction residue in a sludge state. Since the extractant/light oil and kerogen pyrolysis heavy oil are partially remaining in the oil shale extraction residue in the sludge shape, an additional treatment is essentially required to recycle the residue and recover the kerogen pyrolysis heavy oil.

It is possible to improve economic efficiency by recovering the most of kerogen pyrolysis heavy oil existing in the oil shale extraction residue discharged through the extraction process, and remarkably lower the content of a remaining volatile material by effectively recovering the extractant and light oil, which still remain in the oil shale extraction residue. Therefore, an objective of the present invention is to increase recycling feasibility for the environmental friendly recycling of oil shale extraction residue such as an asphalt mixing.

Means for Solving the Problems

A system for evaporating a volatile material to recycle oil shale extraction residue, according to the present invention, can further include the step of re-extracting kerogen by recycling an existing extractant or light oil, which has been already used in the previous steps, so as to efficiently recover additional kerogen pyrolysis heavy oil from the oil shale extraction residue, which is discharged in the state of sludge.

In order to effectively recover additional kerogen pyrolysis heavy oil from the oil shale extraction residue discharged in the sludge state, it is possible to further include the step of re-extracting kerogen by recycling the existing extractant or light oil which has been already used in previous steps.

In order to recover the kerogen pyrolysis heavy oil contained in the oil shale extraction residue, it is possible to additionally extract the kerogen pyrolysis heavy oil contained in the sludge residue by mixing the extractant or light oil having a low boiling point, which has been used in a previous extraction step, with oil shale extraction residue in a light oil mixing tank.

After the extraction of the heavy oil in the light oil mixing tank is finished, the heavy oil is transferred to the sludge separation apparatus and the separated into liquid oil, in which the kerogen pyrolysis heavy oil and the extractant/light oil are mixed, and solid extraction sludge components. Herein, if the concentration of the heavy oil contained in the extraction sludge discharged from the sludge separation apparatus is higher than a predetermined level, it is possible to re-circulate the heavy oil to the light oil mixing tank such that recovered light oil is re-injected thereto so as to be mixed and agitated together, thereby repeating the existing extraction steps. Such a repetitive operation may be carried out by optimizing the repetitive recovering operation in consideration of the recovering feasibility of the kerogen pyrolysis heavy oil and the usability of the residue according to operation costs.

If the concentration of the heavy oil contained in the extraction sludge discharged from the sludge separation apparatus is lower than a predetermined level, the heavy oil passes through the step of being transferred to a light oil evaporation apparatus through an intermediate storage tank such that light oil is recovered through a decompression evaporation method and thus discharged as final oil shale extraction residue.

After most of kerogen pyrolysis heavy oil remaining in the oil shale extraction residue, which is discharged through the kerogen pyrolysis heavy oil extraction step in a light oil mixing tank, is extracted and transferred to the sludge separation apparatus so as to separate the kerogen pyrolysis heavy oil and light oil/extractant, an evaporation step is carried out in a light oil evaporation apparatus. The evaporation step employs the +qdecompression evaporation method at a low vacuum state (negative pressure) lower than normal pressure in order to effectively recover the extractant/light oil remaining in the extraction sludge discharged from the sludge separation apparatus.

In order to increase evaporation efficiency, it is possible to use a paddle disc device having a plurality of shafts in a decompression evaporation apparatus, wherein it is preferable to carry out decompression evaporation during the rotation and agitation of the shafts in the opposite directions from each other. In addition, the shafts rotate towards an outer case so as to efficiently carry out agitating and heating, and a heating medium circulates through the outer case of the evaporation apparatus and the inner cases of the paddle disc shafts so as to uniformly maintain temperature.

Further, in order to carry out the decompression evaporation, it is preferable that the internal pressure of the light oil evaporation apparatus is maintained at negative pressure lower than normal pressure by using a suction pump. Furthermore, it is possible to recover dust particles by mounting a device for separating/eliminating oil shale dust particles transferred together with light oil vapor through the suction pump in the process of the decompression evaporation. As for such a dust particles separating/eliminating device, it is possible to use an electrostatic precipitator, wherein the light oil vapor passing through the electrostatic precipitator can be efficiently recovered using the light oil recovery tank including a cooling water circulation path.

In order to semi-continuously operate the light oil evaporation apparatus, it is possible to mount the intermediate storage tank above an air cutoff valve at the upper end of the light oil evaporation apparatus such that solid extraction sludge to be processed (discharged through the sludge separation apparatus) can be filled in the intermediate storage tank in advance during the operation of the light oil evaporation apparatus. If the evaporation of the light oil is finished in the light oil evaporation apparatus, evaporation residue in an evaporated solid shape is discharged by opening the air cutoff valve at the lower part, new extraction sludge is introduced into the light oil evaporation apparatus from the intermediate storage tank by opening the air cutoff valve at the upper part, thereby enabling the semi-continuous operation.

The present invention as described above relates to an evaporation system for recycling oil shale extraction residue treated and discharged through a kerogen extraction device and a sludge separation apparatus, and includes an evaporation system for recycling oil shale extraction residue, including; a light oil mixing tank for mixing oil shale extraction residue with light oil or an extractant so as to extract heavy oil; a sludge separation apparatus for separating the mixed oil of the light oil/extractant and the heavy oil, which is liquid oil, from remaining the oil shale extraction residue after additional extraction of the heavy oil is finished in the light oil mixing tank; a light oil/extractant distillation tower for separating the mixed oil, which is separated in the sludge separation apparatus, into the heavy oil and the light oil/extractant; an intermediate storage tank for maintaining solid sludge extracted from the mixed oil, which is separated in the sludge separation apparatus; and a light oil evaporation apparatus semi-continuously supplied with the solid sludge, which is extracted in the intermediate storage tank, so as to evaporate light oil.

The light oil mixing tank may include heating medium oil circulation parts for circulating heating medium oil to the outside of the mixing tank so as to uniformly maintain internal temperature, thereby improving extraction efficiency of the heavy oil in the mixing tank, and an agitator for improving the extraction efficiency of the heavy oil in the mixing tank.

The evaporation system for recycling oil shale extraction residue may further include a sludge transfer pump for transferring the oil shale extraction residue to the sludge separation apparatus after the heavy oil is extracted in the light oil mixing tank, and a circulation loop for circulating the transferred oil shale extraction residue to the light oil mixing tank again if the content of the heavy oil of the oil shale extraction residue, which is transferred to the sludge separation apparatus through the sludge transfer pump, is equal to or higher than a predetermined concentration.

The evaporation system for recycling oil shale extraction residue may further include a light oil storage tank for maintaining the light oil or the extractant, which is separated in the light oil/extractant distillation tower, and a re-circulation loop for circulating the light oil or the extractant, which is stored in the light oil storage tank, to the light oil mixing tank.

A screw may be mounted on the lower part of the intermediate storage tank such that the solid sludge can be transferred from the intermediate storage tank to the light oil evaporation apparatus with speed, and a supply valve may be additionally mounted so as to prevent backward introduction into the outlet of the intermediate storage tank.

A suction pump may be additionally connected such that the internal pressure of the light oil evaporation apparatus is maintained to be equal to or less than normal pressure, the light oil evaporation apparatus includes an outer case and a plurality of rotational paddle screws, and heating medium oil circulates through the insides of the outer case and the rotary shafts of the paddle screws of the light oil evaporation apparatus.

Air cutoff valves may be respectively mounted on the inlet and the outlet of the evaporation apparatus for recovering light oil, an electrostatic precipitator may be used for eliminating oil shale dust particles included in light oil vapor generated in the light oil evaporation apparatus, and a light oil recovery tank may be additionally included for recovering the light oil vapor, from which the oil shale dust particles are eliminated through the electrostatic precipitator.

Cooling water circulation paths may be included to the outside of the light oil recovery tank so as to condense the recovered light oil vapor, and a loop can be further included for re-circulating the light oil, which is recovered in the light oil recovery tank, to the light oil mixing.

According to another aspect of the present invention, it is feasible to provide a method for recycling oil shale extraction residue treated and discharged through a kerogen extraction device and a sludge separation apparatus, comprising: the first step of supplying oil shale extraction residue to a light oil mixing tank and mixing the oil shale extraction residue with light oil or an extractant so as to extract heavy oil; the second step of separating the mixed oil of the light oil/extractant and the heavy oil, which is liquid oil, from the oil shale extraction residue, transferred to and remaining in a sludge separation apparatus, after additional extraction of the heavy oil is finished in the light oil mixing tank; the third step of separating the mixed oil, which is separated in the sludge separation apparatus, into the heavy oil and the light oil/extractant in a light oil/extractant distillation tower; the fourth step of maintaining solid extraction sludge separated from the mixed oil, which is separated in the sludge separation apparatus, in an intermediate storage tank; and the fifth step of semi-continuously supplying the solid extraction sludge, which is maintained in the intermediate storage tank, to a light oil evaporation apparatus so as to evaporate light oil.

The intermediate storage tank is supplied with solid extraction sludge for subsequent operation during the operation of the light oil evaporation apparatus, the air cutoff valve of an evaporation apparatus outlet is opened so as to discharge the solid extraction sludge in the light oil evaporation apparatus if the operation of the light oil evaporation apparatus is finished, and after the discharge, the air cutoff valve of the evaporation apparatus outlet is closed and the solid extraction sludge of the intermediate storage tank is introduced, thereby enabling semi-continuous operation.

Effects of the Invention

According to the present invention, it is possible to additionally recover the heavy oil that is the kerogen pyrolysis material contained in the oil shale extraction residue discharged in a sludge state and, simultaneously, recover most of the light oil having a low boiling point and the extractant, contained in the oil shale sludge residue, by using a vacuum evaporation apparatus such that the organic contents such as the extractant and the like in the finally discharged oil shale extraction residue can be reduced.

Further, when the final oil shale residue is discharged, the kerogen pyrolysis heavy oil contained therein can be recovered to the maximum. Therefore, the shale oil recovering efficiency is increased, increasing the economic feasibility, and the remaining amount of the extractant and the light oil is minimized, enabling the finally discharged oil shale extraction residue to be used for the environmental friendly recycling, for example as an asphalt reinforcement supplementary and the like.

MODE FOR CARRYING OUT THE INVENTION

Hereinafter, with reference to the attached drawings, a system for evaporating a volatile material to recycle oil shale extraction residue and a method for recycling oil shale extraction residue using the same, according to preferred embodiments of the present invention will be described in detail.

Figure 1:
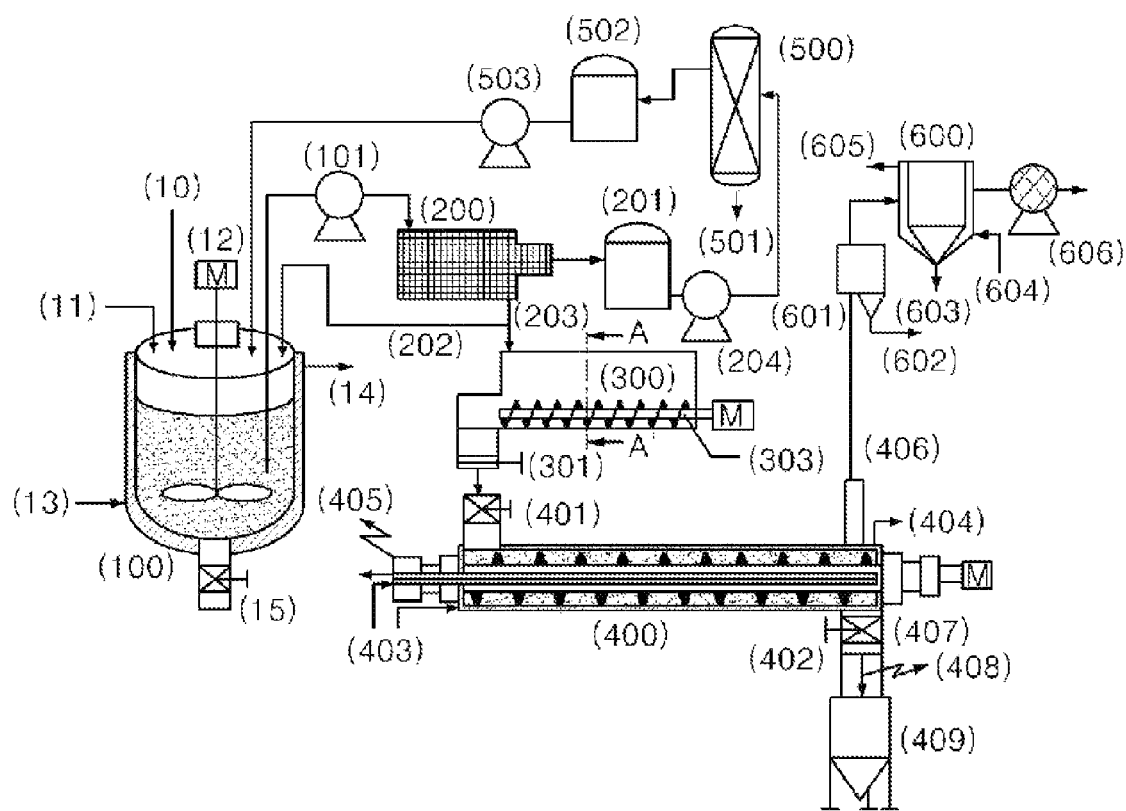
FIG. 1 is a view showing the system for evaporating a volatile material to recycle sludge that is the oil shale extraction residue treated through a kerogen extracting device, according to the present invention.
Figure 2:
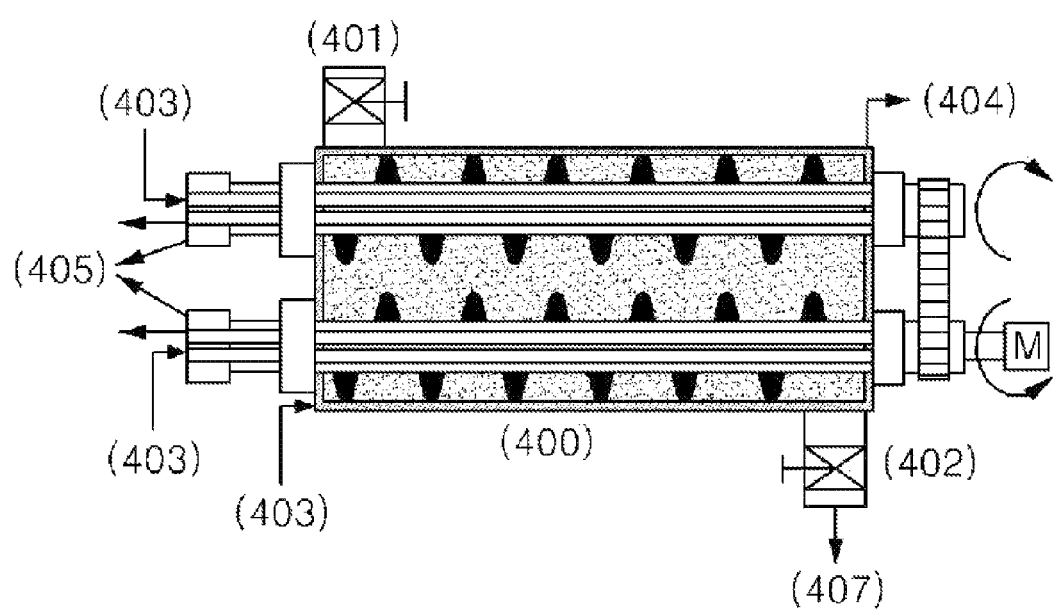
FIG. 2 is a detailed view of a light oil evaporation apparatus included in the system for evaporating a volatile material, according to the present invention, which shows a structure, in which an outer case is provided and two paddle screws are provided in the outer case.
Figure 3:
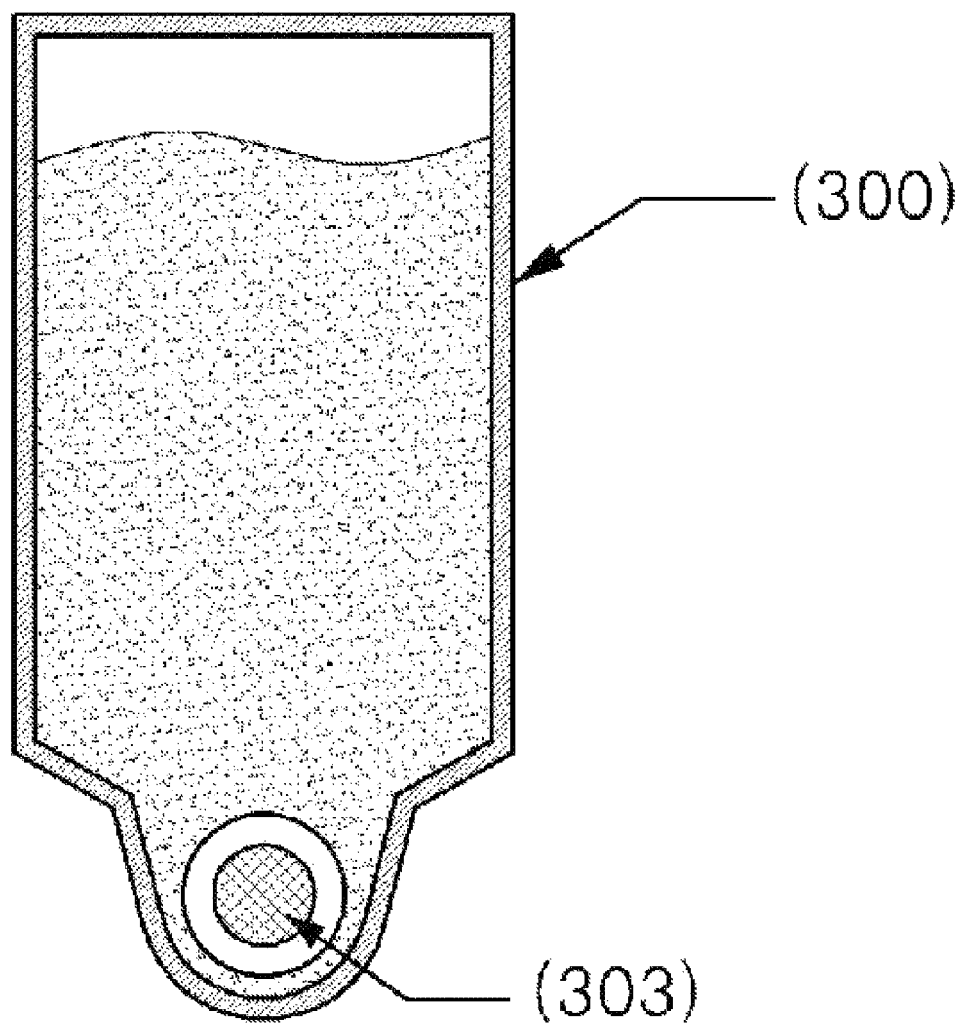
FIG. 3 is a cross-sectional view showing an intermediate storage tank included in the system for evaporating a volatile material, according to the present invention.

FIG. 1 is a view showing the structure of a system for evaporating a volatile material to recycle oil shale extraction residue, according to the present invention. The oil shale extraction residue used in the present invention is to be the oil shale extraction residue separated through a kerogen extraction device and a sludge separation apparatus, as mentioned in Korean patent application No. 2013-0025437, which has been previously filed by the present application, wherein the oil shale extraction residue includes the mixture of a part of the kerogen pyrolysis heavy oil and the remaining extractant/light oil, which are not extracted by the extraction device or not separated by the separation device, and oil shale residue.

The oil shale extraction residue 10 is introduced into a light oil mixing tank 100 and mixed with the light oil/extractant 11 so as to be agitated 12 for a predetermined time, wherein it is preferable to use an agitating mixing tank 100 for extracting heavy oil contained in the oil shale extraction residue. If the extraction is finished after the predetermined time, the heavy oil is transferred to a sludge separation apparatus 200 through a sludge transfer pump 101 such that liquid oil components, in which the kerogen pyrolysis heavy oil and the extractant/light oil are mixed, and solid extraction sludge 203 components are separated. The oil shale extraction residue in the separated solid sludge shape is stored in an intermediate storage tank 300.

At this time, if a predetermined concentration or higher of the heavy oil remains in the separated oil shale extraction residue, the heavy oil is re-injected 202 into the light oil mixing tank 100 such that the re-extraction of the heavy oil is carried out, wherein such re-extraction is operated through optimization in consideration of operation costs and the amount of the heavy oil to be recovered.

In order to introduce the oil shale extraction residue in the shape of the sludge, which is introduced into the intermediate storage tank 300, into a light oil evaporation apparatus 400, a supply valve 301 mounted on the lower part of the intermediate storage tank 300 and an air cutoff valve A 401 at the upper part of the light oil evaporation apparatus 400 are opened in a state, in which an air cutoff valve B 402 at the lower part of the evaporation apparatus 400 is closed, and a screw 303 of the intermediate storage tank 300 is operated such that the oil shale extraction residue in the sludge shape is transferred to the light oil evaporation apparatus 400. If the transfer is finished, the light oil evaporation apparatus 400 operates in a state, in which the air cutoff valve B 402 at the lower part of the evaporation apparatus is closed.

At this time, the oil shale extraction residue in the sludge shape is additionally introduced into the intermediate storage tank 300 such that preparation work for the operation of the light oil evaporation apparatus for a next step may be carried out, wherein it is preferable to mount a supply valve 301 for preventing the backward introduction to an outlet.

The mixed oil of the extractant/light oil that is the liquid oil component separated in the sludge separation apparatus 200 and the heavy oil is transferred to a light oil/extractant distillation tower 500 through a transfer pump 204, such that the heavy oil 501 is separated to the lower part of the distillation tower 500 and the extractant and light oil is separated to the upper part of the distillation tower 500 so as to be stored in a light oil storage tank 502. The extractant and light oil thus stored in the light oil storage tank is circulated to the light oil mixing tank 100 so as to be used again in the heavy oil extracting step as mentioned hereinabove.

The light oil recovering evaporation apparatus 400 includes an outer case and two or more rotational paddle screws, and is designed such that heating medium oil flows through the insides of the outer case and a plurality of screw shafts so as to maximize heating effect simultaneously with uniformly maintaining temperature. In addition, the plurality of screw shafts rotate in the opposite directions from each other, wherein the screw shafts rotate in the outward direction towards the outer case so as to increase heating and agitating effect. Further, in order to increase the evaporation efficiency of the light oil and the extractant, it is preferable to operate the light oil evaporation apparatus 400 in a low vacuum state. To this end, it is preferable to provide an additional suction pump such that the internal pressure of the light oil evaporation apparatus can be maintained as negative pressure lower than normal pressure.

It is preferable to provide an electrostatic precipitator 601 as a dust filtering device so as to separate/recover oil shale dust particles, which are solid fine particles discharged together with light oil vapor, generated in the light oil evaporation apparatus 400, in the process of discharging the light oil vapor through a light oil vapor discharge hole, and it is preferable that a light oil recovery tank 600 for circulating cooling water is mounted behind the electrostatic precipitator and includes cooling water circulation paths 604, 605 provided to the outside of the light oil recovery tank 600 so as to condense the recovered light oil vapor. Through these, the light oil and the extractant, evaporated in the light oil evaporation apparatus 400, are recovered to the light oil recovery tank 600. The light oil recovered to the light oil recovery tank 600 may be re-circulated to the light oil mixing tank 100 through a re-circulation loop.

At this time, the temperature of the dust filtering device is adjusted to be maintained equal to or higher than the final boiling point temperature of the light oil or the extractant such that the light oil vapor is not condensed. Filtered materials recovered through the electrostatic precipitator 601 also contain parts of light oil. Therefore, the filtered materials are re-circulated so as to be injected to the light oil evaporation apparatus together with the solid extraction sludge introduced into the light oil evaporation apparatus 400 from the intermediate storage tank 300, thereby restraining the generation of secondary waste.

The final oil shale extraction residue, passing through the light oil evaporation apparatus 400, reaches a state, in which the light oil and the extractant are almost recovered therefrom and only the heavy oil that is extremely a part of the kerogen pyrolysis material, remains. Therefore, the finally remaining oil shale extract may be used for the environmental friendly recycling, for example, an asphalt reinforcement filler.

After the evaporation step is finished in the light oil evaporation apparatus, it is possible to discharge the final oil shale extraction residue by opening the air cutoff valve B 402, wherein the final oil shale extraction residue is not directly discharged to the outside in order to lower the danger of a fire but the final oil shale extraction residue is injected into a sealed space of a temporary storage tank 409 so as to be discharged when the temporary storage tank is filled with the final oil shale extraction residue by a predetermine amount or more.

The operation temperature of the light oil evaporation apparatus 400 has to be higher than the initial boiling point, which is high, since extraction phenomenon occurs if the temperature is lower than the initial boiling point of the heavy oil used for asphalt. If the discharge of the light oil and the extractant is not carried out in the light oil evaporation apparatus 400, the operation of the light oil evaporation apparatus is stopped and the air cutoff valve B 402 is opened such that the oil shale residue is finally recovered and then the air cutoff valve B 402 is closed again and the supply valve 301 of the intermediate storage tank 300 and the air cutoff valve A 401 are opened such that extraction sludge is injected, thereby carrying out repetitive operation and realizing the semi-continuous operation.

Explaining the reference signs which are not mentioned above, 13 and 14 respectively indicate a heating medium oil introduction part and a heating medium oil discharge part, and 15 indicates a discharge valve. Further, 201 indicates a mixed oil storage tank, 202 indicates a sludge re-circulation loop, 403 and 404 respectively indicate a heating medium oil inlet and a heating medium oil outlet. 405 indicates a rotary seal, 406 and 407 respectively indicate a light oil vapor discharge hole and a residue discharge hole, and 408 indicates oil shale residue.

503 and 606 respectively indicate the circulation pump and the suction pump, and 602 and 603 respectively indicate the filtered material and the light oil/extractant.

As described above, while the present invention has been particularly described with reference to the certain embodiments thereof, it will be understood by those of ordinary skill in the art, to which the present invention belongs, that the present invention is not limited to such embodiments and explanations and may be implemented through various modifications without departing from the scope of the prevent invention and such modifications belong to the protection range of the present invention.

INDUSTRIAL APPLICABILITY

The present invention can increase the recovering amount of the heavy oil by additionally recovering the heavy oil, the light oil/extractant and the like still remaining in the sludge that is the extraction residue of the oil shale, from which the heavy oil is recovered using the extractant, realize an environment-friendly post-processing step by decreasing the organic contents in the oil shale residue through the elimination of the light oil/extractant and the like in the oil shale residue, which is finally discharged, and minimize the amount of the heavy oil and the extractant in the remaining sludge by passing the heavy oil, extracted from the oil shale by using the light oil or the extractant, through the sludge separation apparatus and the evaporation process, thereby being industrially applicable.

What is claimed is:
1. An evaporation system for recycling oil shale extraction residue treated and discharged through a kerogen extraction device and a sludge separation apparatus, the evaporation system comprising;
  a light oil mixing tank (100) for mixing an oil shale extraction residue (10) with a light oil or an extractant (11) so as to extract a heavy oil;
  a sludge separation apparatus (200) for separating mixed oil of the light oil/extractant and the heavy oil, which is a liquid oil, from remaining the oil shale extraction residue after additional extraction of the heavy oil is finished in the light oil mixing tank (100);
  a light oil/extractant distillation tower (500) for separating the mixed oil, which is separated in the sludge separation apparatus (200), into the heavy oil and the light oil/extractant;
  an intermediate storage tank (300) for maintaining a solid sludge extracted from the mixed oil, which is separated in the sludge separation apparatus (200);
  a light oil evaporation apparatus (400) semi-continuously supplied with the solid sludge, which is extracted in the intermediate storage tank (300), so as to evaporate the light oil;
  a sludge transfer pump (101) for transferring the oil shale extraction residue to the sludge separation apparatus (200) after the heavy oil is extracted in the light oil mixing tank (100); and
  a circulation loop (202) for circulating the transferred oil shale extraction residue to the light oil mixing tank (100) again if the content of the heavy oil of the oil shale extraction residue, which is transferred to the sludge separation apparatus (200) through the sludge transfer pump (101), is equal to or higher than a predetermined concentration.

2. The evaporation system for recycling oil shale extraction residue according to claim 1, wherein the light oil mixing tank (100) includes heating medium oil circulation parts (13, 14) for circulating heating medium oil to the outside of the mixing tank so as to uniformly maintain internal temperature and improve extraction efficiency of the heavy oil; and the light oil mixing tank (100) is to be an agitating mixing tank including an agitator (12) for improving the extraction efficiency of the heavy oil in the mixing tank.

3. The evaporation system for recycling oil shale extraction residue according to claim 1, further comprising: a light oil storage tank (502) for maintaining the light oil or the extractant, which is separated in the light oil/extractant distillation tower (500); and a re-circulation loop for circulating the light oil or the extractant, which is stored in the light oil storage tank (502), to the light oil mixing tank (100).

4. The evaporation system for recycling oil shale extraction residue according to claim 1, wherein a screw (303) is mounted on the lower part of the intermediate storage tank (300) such that the solid sludge, which is extracted in the intermediate storage tank (300), can be transferred to the light oil evaporation apparatus (400) with speed, and a supply valve (301) is additionally mounted so as to prevent backward introduction into an outlet of the intermediate storage tank.

5. The evaporation system for recycling oil shale extraction residue according to claim 1, further comprising an electrostatic precipitator (601) for eliminating oil shale dust particles included in light oil vapor generated in the light oil evaporation apparatus (400).

6. The evaporation system for recycling oil shale extraction residue according to claim 1, further comprising a light oil recovery tank (600) for recovering the light oil vapor, from which oil shale dust particles are eliminated through an electrostatic precipitator (601).

7. The evaporation system for recycling oil shale extraction residue according to claim 6, wherein cooling water circulation paths (604, 605) are included to the outside of the light oil recovery tank (600) so as to condense the recovered light oil vapor; and comprising a loop for re-circulating the light oil, which is recovered in the light oil recovery tank (600), to the light oil mixing tank.

8. An evaporation system for recycling oil shale extraction residue treated and discharged through a kerogen extraction device and a sludge separation apparatus, the evaporation system comprising;
  a light oil mixing tank (100) for mixing an oil shale extraction residue (10) with a light oil or an extractant (11) so as to extract a heavy oil;
  a sludge separation apparatus (200) for separating mixed oil of the light oil/extractant and the heavy oil, which is a liquid oil, from remaining the oil shale extraction residue after additional extraction of the heavy oil is finished in the light oil mixing tank (100);

a light oil/extractant distillation tower (500) for separating the mixed oil, which is separated in the sludge separation apparatus (200), into the heavy oil and the light oil/extractant;

an intermediate storage tank (300) for maintaining a solid sludge extracted from the mixed oil, which is separated in the sludge separation apparatus (200); and a light oil evaporation apparatus (400) semi-continuously supplied with the solid sludge, which is extracted in the intermediate storage tank (300), so as to evaporate the light oil, wherein the light oil evaporation apparatus (400) includes an outer case and a plurality of rotational paddle screws.

9. The evaporation system for recycling oil shale extraction residue according to claim 8, wherein the light oil mixing tank (100) includes heating medium oil circulation parts (13, 14) for circulating heating medium oil to the outside of the mixing tank so as to uniformly maintain internal temperature and improve extraction efficiency of the heavy oil; and the light oil mixing tank (100) is to be an agitating mixing tank including an agitator (12) for improving the extraction efficiency of the heavy oil in the mixing tank.

10. The evaporation system for recycling oil shale extraction residue according to claim 8, further comprising: a light oil storage tank (502) for maintaining the light oil or the extractant, which is separated in the light oil/extractant distillation tower (500); and a re-circulation loop for circulating the light oil or the extractant, which is stored in the light oil storage tank (502), to the light oil mixing tank (100).

11. The evaporation system for recycling oil shale extraction residue according to claim 8, wherein a screw (303) is mounted on the lower part of the intermediate storage tank (300) such that the solid sludge, which is extracted in the intermediate storage tank (300), can be transferred to the light oil evaporation apparatus (400) with speed, and a supply valve (301) is additionally mounted so as to prevent backward introduction into an outlet of the intermediate storage tank.

12. The evaporation system for recycling oil shale extraction residue according to claim 8, further comprising an electrostatic precipitator (601) for eliminating oil shale dust particles included in light oil vapor generated in the light oil evaporation apparatus (400).

13. The evaporation system for recycling oil shale extraction residue according to claim 8, further comprising a light oil recovery tank (600) for recovering light oil vapor, from which oil shale dust particles are eliminated through an electrostatic precipitator (601).

14. The evaporation system for recycling oil shale extraction residue according to claim 13, wherein cooling water circulation paths (604, 605) are included to the outside of the light oil recovery tank (600) so as to condense the recovered light oil vapor; and comprising a loop for re-circulating the light oil, which is recovered in the light oil recovery tank (600), to the light oil mixing tank.

15. An evaporation system for recycling oil shale extraction residue treated and discharged through a kerogen extraction device and a sludge separation apparatus, the evaporation system comprising;

a light oil mixing tank (100) for mixing an oil shale extraction residue (10) with a light oil or an extractant (11) so as to extract a heavy oil;

a sludge separation apparatus (200) for separating mixed oil of the light oil/extractant and the heavy oil, which is a liquid oil, from remaining the oil shale extraction residue after additional extraction of the heavy oil is finished in the light oil mixing tank (100);

a light oil/extractant distillation tower (500) for separating the mixed oil, which is separated in the sludge separation apparatus (200), into the heavy oil and the light oil/extractant;

an intermediate storage tank (300) for maintaining a solid sludge extracted from the mixed oil, which is separated in the sludge separation apparatus (200);

a light oil evaporation apparatus (400) semi-continuously supplied with the solid sludge, which is extracted in the intermediate storage tank (300), so as to evaporate the light oil;

wherein heating medium oil circulates (403, 404) through insides of an outer case and rotary shafts of paddle screws of the light oil evaporation apparatus (400); and air cutoff valves (401,402) are respectively mounted on an inlet and outlet of the light oil evaporation apparatus (400).

16. The evaporation system for recycling oil shale extraction residue according to claim 15, wherein the light oil mixing tank (100) includes heating medium oil circulation parts (13, 14) for circulating heating medium oil to the outside of the mixing tank so as to uniformly maintain internal temperature and improve extraction efficiency of the heavy oil; and the light oil mixing tank (100) is to be an agitating mixing tank including an agitator (12) for improving the extraction efficiency of the heavy oil in the mixing tank.

17. The evaporation system for recycling oil shale extraction residue according to claim 15, further comprising: a light oil storage tank (502) for maintaining the light oil or the extractant, which is separated in the light oil/extractant distillation tower (500); and a re-circulation loop for circulating the light oil or the extractant, which is stored in the light oil storage tank (502), to the light oil mixing tank (100).

18. The evaporation system for recycling oil shale extraction residue according to claim 15, wherein a screw (303) is mounted on the lower part of the intermediate storage tank (300) such that the solid sludge, which is extracted in the intermediate storage tank (300), can be transferred to the light oil evaporation apparatus (400) with speed, and a supply valve (301) is additionally mounted so as to prevent backward introduction into an outlet of the intermediate storage tank.

19. The evaporation system for recycling oil shale extraction residue according to claim 15, further comprising an electrostatic precipitator (601) for eliminating oil shale dust particles included in light oil vapor generated in the light oil evaporation apparatus (400).

20. The evaporation system for recycling oil shale extraction residue according to claim 15, further comprising a light oil recovery tank (600) for recovering light oil vapor, from which oil shale dust particles are eliminated through an electrostatic precipitator (601).

* * * * *